United States Patent Office 2,922,889
Patented Jan. 26, 1960

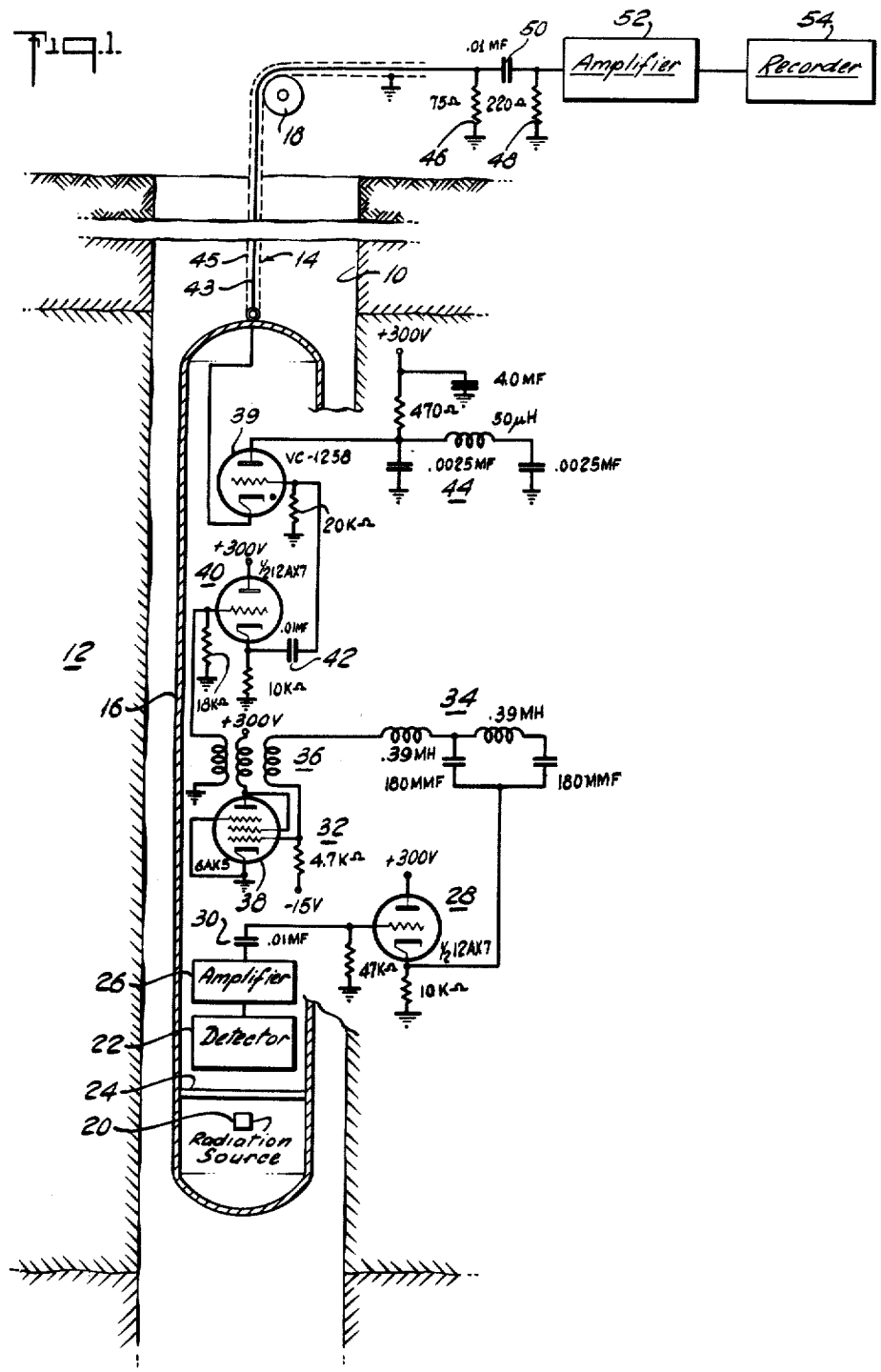

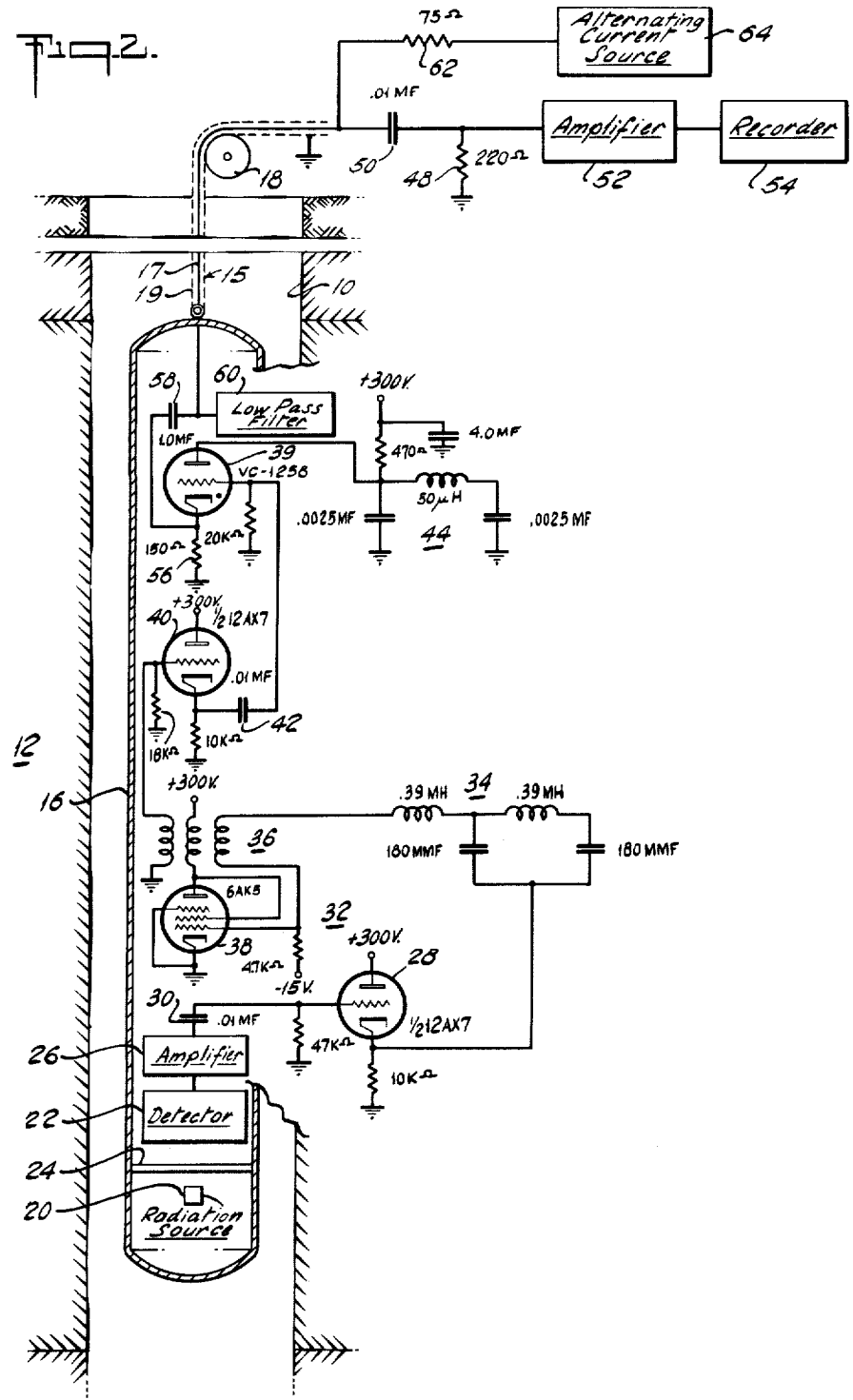

2,922,889

WELL LOGGING SYSTEMS

Hugh E. Hall, Jr., Bellaire, Tex., assignor to Texaco Inc., a corporation of Delaware Application February 17, 1956, Serial No. 566,186

12 Claims. (Cl. 250—83.6)

This invention relates to pulse transmission circuits and more particularly to pulse transmission circuits in well logging systems for transmitting pulses from a pulse source located deep down in a bore hole to receiving or recording apparatus located at the surface of the earth.

In well logging, particularly in radioactive well logging, pulses from a logging instrument located in a bore hole must be transmitted to the surface equipment at a very high repetition rate over a long cable which very often detrimentally affects the size and shape of the original pulses to such an extent that the identity of the original pulses is lost.

In order to more readily identify the original pulses at the receiving apparatus after transmission over a long cable, a scaling circuit has been used in the logging instrument to reduce the number of pulses produced by the pulse source by a fixed proportion before transmitting them over the cable to the receiving apparatus. A circuit of this type employed in well logging systems is disclosed in U.S. Patent No. 2,666,146, granted to Gerhard Herzog on January 12, 1954.

It is an object of this invention to provide an improved pulse transmission circuit for well logging systems.

It is another object of this invention to provide an improved pulse transmission circuit for well logging systems which requires less equipment in the logging instrument.

It is still another object of this invention to provide an improved pulse transmission circuit for well logging systems which is more economical than transmission circuits used heretofore.

It is a further object of this invention to provide a pulse transmission circuit for well logging systems which eliminates the scaling circuit and switching means associated therewith, which are high consumers of power and a source of a considerable amount of trouble, in the logging instrument.

It is a still further object of this invention to provide a pulse transmission circuit for well logging which transmits all of the pulses originating in a logging instrument pulse source, for example, a gas filled Geiger-type counter which is responsive to neutron-gamma and scattered-gamma rays.

In accordance with this invention, in a well logging system in which a pulse source produces pulses of a high repetition rate for transmission through a well logging cable, a pulse transmission circuit is provided which includes means responsive to said pulses for producing high-power, short-duration pulses having a form such that their resolution time at the output end of the cable is many times less than that of the pulses ordinarily transmitted through a well logging cable.

For a more complete understanding of the present invention reference may be had to the following description taken in conjunction with the accompanying drawings wherein:

Fig. 1 diagrammatically represents a radioactive well logging system which embodies the present invention; and Fig. 2 illustrates a modification of the system shown in Fig. 1.

Referring to Fig. 1 in more detail, a bore hole 10 is shown traversing subsurface formations such as the one indicated at 12. Suspended within the hole by means of the well logging cable 14 is a logging instrument housing 16, this instrument being adapted to be lowered and raised through the hole by means of the cable 14 which at the surface passes over a suitable cable-measuring device 18 providing an indication of the depth of the instrument in the hole at all times.

Within housing 16 and preferably near the bottom thereof is a radiation source 20 of radioactive rays, for example, a neutron source comprising a mixture of radium and beryllium. A suitable detector 22 of the pulse producing type, for example, a gas filled Geiger-type counter, is disposed above the radiation source 20. Between the source 20 and the detector 22 is a shield 24 of a substance such as lead capable of absorbing the direct radioactive rays which would otherwise tend to pass directly from the source 20 to the detector 22. Above the detector 22 and connected to the output thereof is an amplifier 26 which may serve the purpose of preamplifying the pulses produced by the detector 22. The pulses from amplifier 26 are applied to the control grid of a first cathode-follower amplifier 28 through a capacitor 30. The output from cathode-follower amplifier 28 is coupled to a blocking oscillator 32 which produces at its output pulses of substantially equal amplitude and which includes a delay network 34, a transformer 36 and a pentode 38. The signal derived from the cathode of cathode-follower amplifier 28 is applied through the delay network 34 and through a winding of transformer 36 to the control grid of pentode 38. The cathode-follower amplifier 28 is used to provide a low impedance stage for matching the impedance of the delay network 34. The delay network 34 is provided to reflect a pulse of reverse polarity to cut off the pentode 38 in order to produce sharp trigger pulses of equal amplitude in the output of the blocking oscillator 32. If desired the delay network 34 may be replaced by an appropriate length of coaxial cable, the sheath of the cable being connected to the cathode of cathode-follower amplifier 28 and the center conductor of the coaxial cable being connected to transformer 36. The output of the blocking oscillator 32 is derived from a second winding of the transfomer 36 which is coupled to the control grid of a gas discharge tube, for example, a hydrogen thyratron 39, of a thyratron output stage via a second cathode-follower amplifier 40 and a capacitor 42. The anode of the thyratron 39 is connected to another delay network 44, which may also be an appropriate length of coaxial cable and which is provided to cut off the thyratron in a very short interval of time. The cathode of the thyratron 39 is directly coupled to the cable 14 which may include one or more conductors, one of which is shown at 43, enclosed within a steel jacket 45. At the surface a resistor 46 is connected from the conductor 43 of cable 14 to ground to provide a direct current return path for the thyratron 39 and also to provide a discharge path for the cable 14. A second resistor 48 and a capacitor 50 form a differentiator which is connected to the surface end of the cable 14. The differentiated signals are then applied to an amplifier 52 to the output of which may be connected an indicating device, for example a recorder 54.

Although not shown in the drawing in order to avoid needless complication thereof, it should be understood that the logging system must include an appropriate power source supplying energy to the various stages of the system, as is well known in the art.

As shown in Fig. 2, with a slight modification this transmission circuit may also be used to supply alternating current power to the logging instrument over cable 15 which may include a single conductor 17 enclosed within a steel jacket 19. The circuit illustrated in Fig. 2 is similar to the circuit shown in Fig. 1 from the detector 20 up to and including the second cathode-follower amplifier 40. The modified circuit includes a resistor 56 connected from the cathode of the thyratron 39 to ground, and a capacitor 58 coupling the lower end of cable 15 to the cathode of thyratron 39. Also connected to the lower end of cable 15 is a low pass filter 60 designed to pass alternating current, for example, 60 cycle power, to the power supply unit (not shown) of the logging instrument. The surface end of the cable 15 is connected to an alternating current source 64 through a resistor 62. The surface end of cable 15 is also connected through the differentiator 48, 50 to amplifier 52 in the same manner as shown in Fig. 1.

In Fig. 1 each pulse from the output of the blocking oscillator 32 is approximately 2.0 microseconds long and has a magnitude of 200 volts. This trigger pulse is fed through the cathode-follower amplifier 40 to trigger the hydrogen thyratron 39. The values of the components of the delay network 44 and the capacity of the cable 14 are such that the thyratron is cut off in approximately 0.1 microsecond. This action produces a pulse at the surface end of the cable 14, approximately 10,000 feet long, which is 2.5 volts in height over resistor 46, having a resistance of 75 ohms, with an 8 microsecond rise time and approximately an 80 microsecond fall time. This output pulse is then differentiated by differentiator 48, 50 to produce a pulse having a total width of approximately 12 microseconds and 1.5 volts over the 220 ohms of resistor 48.

When the well logging system is modified as shown in Fig. 2, 240 volts at 60 cycle may be transmitted through the cable 15 from power source 64 simultaneously with the transmission of the high repetition rate pulses from the logging instrument. In this event the differentiated pulses at the surface have a magnitude of 0.5 volt with a 12 microsecond resolution time.

In the thyratron output stage of each of the circuits illustrated in Figs. 1 and 2 a hydrogen thyratron is preferred since the jitter with triggering and the deionization time are both very small in comparison to other gas thyratrons. The component values shown in the drawings are those which were used in the system constructed to produce the 12 microsecond resolution time, which, of course, may be varied by modifying the described circuit in any one of many ways. Since present methods of pulse transmission through a logging cable produce a resolution time of approximately 100 microseconds it can be readily seen that the thyratron output stage of the herein described systems can readily replace a scaling circuit having a scale of eight.

Obviously, many modifications and variations of the invention as hereinabove set forth may be made without departing from the spirit and scope thereof and therefore only such limitations should be imposed as are indicated in the appended claims.

I claim:

1. In a well logging system in which a pulse source produces pulses of a high repetition rate for transmission through a well logging cable which are ordinarily incapable of being resolved at the output end of the cable, a pulse transmission circuit comprising means including a hydrogen thyratron tube responsive to said pulses for producing high-power pulses of substantially one microsecond duration at said high repetition rate and means for applying said high-power, short-duration pulses to the input end of said cable, said high-power short-duration pulses having a form such that they are capable of being resolved at the output end of said cable.

2. In a well logging system in which a pulse source produces first pulses of a high repetition rate for transmission through a well logging cable which have a resolution time of the order of 100 microseconds and are incapable of being resolved at the output end of the cable, a pulse transmission circuit comprising means responsive to said pulses for producing high-power short-duration pulses of said high repetition rate, said means including a trigger circuit responsive to said first pulses for producing trigger pulses of equal amplitude and a hydrogen thyratron output stage responsive to said trigger pulses for producing said high-power short-duration pulses and means for applying said high-power, short-duration pulses to the input end of said cable, said high-power, short-duration pulses having a form such that their resolution time at the output end of said cable is in the order of 12 microseconds and they are capable of being resolved at the output end of said cable.

3. A pulse transmission circuit as set forth in claim 2 wherein said trigger circuit includes a blocking oscillator.

4. A well logging system comprising a well logging cable, a pulse source for producing pulses of a high repetition rate for transmission through said cable which are ordinarily of such a high rate that they are incapable of being resolved at the output end of said cable, an amplifier for amplifying said pulses, a hydrogen thyratron output stage responsive to said first pulses for producing high-power, pulses of a short duration of at least about one microsecond at said high repetition rate, means for applying said high-power, short-duration pulses to the input end of said cable, said high-power, short-duration pulses having a form such that they are capable of being resolved at the output end of said cable and means coupled to the output end of said cable for receiving said high-power, short-duration pulses.

5. A well logging system as set forth in claim 4 wherein said amplifier includes a trigger circuit responsive to said first pulses for producing trigger pulses of equal amplitude and wherein said means for receiving said high-power, short-duration pulses includes a differentiator.

6. A system for radioactive logging of a bore hole traversing subsurface formations comprising an instrument housing adapted to be passed through the hole, a cable for supporting said housing in its travel through the hole, a radiation source disposed in said housing, pulse producing means for detecting within the housing rays produced in the formations due to bombardment by the rays from the radiation source, means for amplifying the pulses from said detecting means, a trigger circuit responsive to the pulses from the output of said amplifying means for producing trigger pulses of substantially equal amplitude, a hydrogen thyratron output stage responsive to said trigger pulses for producing high-power, short-duration pulses, the output from said hydrogen thyratron output stage being connected to the lower end of said cable, a differentiator coupled to the surface end of said cable, an amplifier coupled to said differentiator for amplifying the differentiated pulses and means for recording the output from said amplifier.

7. A system for logging a borehole traversing subsurface formations comprising an instrument housing adapted to be passed through the borehole, an electrical cable adapted for supporting said housing in its travel through the hole, signal means disposed in said housing for producing electric pulses, means responsive to said electric pulses for producing trigger pulses of equal amplitude, and a hydrogen thyratron output stage responsive to said trigger pulses for producing high-power, short-duration pulses coupled to said electrical cable and means disposed at the surface and coupled to said cable for receiving the pulses from the output of said hydrogen thyratron output stage.

8. A system for logging a borehole traversing subsurface formations comprising an instrument housing adapted to be passed through the borehole, means disposed in said housing for producing electric signals, pulse receiving means disposed at the surface of the earth, a conductor cable connected between said housing and said pulse receiving means, a hydrogen thyratron output stage disposed in said housing and responsive to said electric signals for producing high-power, short-duration pulses, and means for applying said high-power, short-duration pulses to said conductor cable for transmission therethrough to said surface pulse receiving means.

9. A system as set forth in claim 8 wherein said hydrogen thyratron output stage includes a pulse forming network and a hydrogen thyratron tube, said tube being connected between said pulse forming network and said conductor cable.

10. A system as set forth in claim 9 where said pulse forming network is a delay line.

11. A system as set forth in claim 10 wherein said delay line is a length of coaxial cable.

12. A system as set forth in claim 8 wherein said pulse receiving means includes a differentiating circuit.

References Cited in the file of this patent

UNITED STATES PATENTS

| 2,321,295 | Howell | June 8, 1943 |
| 2,369,550 | Frosch | Feb. 13, 1945 |
| 2,412,575 | Frosch | Dec. 17, 1946 |